US012577401B2

(12) United States Patent
Shin et al.

(10) Patent No.: US 12,577,401 B2
(45) Date of Patent: Mar. 17, 2026

(54) CURABLE RESIN COMPOSITION, CURED FILM FORMED THEREFROM, AND ELECTRONIC DEVICE HAVING CURED FILM

(71) Applicant: SAMSUNG SDI CO., LTD., Yongin-si (KR)

(72) Inventors: Dongju Shin, Suwon-si (KR); Ji Yoon Kim, Suwon-si (KR); Minji So, Suwon-si (KR); Seungeun Lee, Suwon-si (KR); Jeehyun Ryu, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 656 days.

(21) Appl. No.: 17/923,701

(22) PCT Filed: May 4, 2021

(86) PCT No.: PCT/KR2021/005578

§ 371 (c)(1),
(2) Date: Nov. 7, 2022

(87) PCT Pub. No.: WO2021/230552

PCT Pub. Date: Nov. 18, 2021

(65) Prior Publication Data

US 2023/0279230 A1 Sep. 7, 2023

(30) Foreign Application Priority Data

May 14, 2020 (KR) ........................ 10-2020-0057798
Apr. 14, 2021 (KR) ........................ 10-2021-0048694

(51) Int. Cl.
*C08L 83/06* (2006.01)
*C08G 77/18* (2006.01)
*C08K 9/08* (2006.01)

(52) U.S. Cl.
CPC .............. *C08L 83/06* (2013.01); *C08G 77/18* (2013.01); *C08K 9/08* (2013.01); *C08L 2203/16* (2013.01); *C08L 2203/206* (2013.01)

(58) Field of Classification Search
CPC ................. C08L 83/06; C08L 2203/16; C08L 2203/206; C08G 77/18; C08K 9/08
See application file for complete search history.

(56) References Cited

U.S. PATENT DOCUMENTS

| | | | |
|---|---|---|---|
| 4,781,858 | A | 11/1988 | Mizukami et al. |
| 6,583,248 | B1 | 6/2003 | Bowen |
| 2006/0009592 | A1 | 1/2006 | Ochs et al. |
| 2009/0213462 | A1 | 8/2009 | Wakizaka et al. |
| 2009/0214872 | A1 | 8/2009 | Minami-Ashigara-Shi et al. |
| 2018/0072028 | A1 | 3/2018 | Ueki et al. |

FOREIGN PATENT DOCUMENTS

| | | | | |
|---|---|---|---|---|
| CN | 1962748 | A | 5/2007 | |
| JP | 2006-257407 | A | 9/2006 | |
| JP | 2007-238665 | A | 9/2007 | |
| JP | 2009-057450 | A | 3/2009 | |
| JP | 2009-241387 | A | 10/2009 | |
| JP | 4914585 | B2 | 4/2012 | |
| JP | 6503128 | B1 | 4/2019 | |
| JP | 6519531 | B2 | 5/2019 | |
| KR | 10-2007-0050372 | A | 5/2007 | |
| KR | 10-2007-0084144 | A | 8/2007 | |
| KR | 10-0793594 | B1 | 1/2008 | |
| KR | 10-2009-0040012 | A | 4/2009 | |
| KR | 10-2011-0039862 | A | 4/2011 | |
| KR | 10-1523819 | B1 | 5/2015 | |
| KR | 10-1659709 | B1 | 9/2016 | |
| KR | 20180044626 | A * | 5/2018 | ............. G03F 7/168 |
| TW | 200730576 | A | 8/2007 | |
| TW | 201925334 | A | 7/2019 | |
| WO | WO 2019/112126 | A1 | 6/2019 | |

OTHER PUBLICATIONS

KR 20180044626A machine translation (Year: 2018).*
Khan et al, Methods for Selective Modifications of Cyclodextrins, 1998, Chemical Reviews, vol. 98, No. 5, p. 1977-1996 (Year: 1998).*
International Search Report dated Aug. 5, 2021 for PCT/KR2021/005578.
Chinese Office Action (including a search report) dated Jun. 17, 2023, of the corresponding Chinese Patent Application No. 202180034638.5.

* cited by examiner

*Primary Examiner* — Mark Eashoo
*Assistant Examiner* — Caitlin Norine Illing
(74) *Attorney, Agent, or Firm* — Lee IP Law, P.C.

(57) ABSTRACT

The present invention provides a curable resin composition including (A) a silicone-based polymer, (B) hollow particles including a silane group-containing cyclodextrin-based compound including an unsaturated bond on the surface thereof, and (C) a solvent, a cured film obtained by curing the curable resin composition, and an electronic device including the cured film.

15 Claims, No Drawings

CURABLE RESIN COMPOSITION, CURED FILM FORMED THEREFROM, AND ELECTRONIC DEVICE HAVING CURED FILM

CROSS REFERENCE TO RELATED APPLICATIONS

This is the U.S. national phase application based on PCT Application No. PCT/KR2021/005578, filed May 4, 2021, which is based on Korean Patent Application No. 10-2020-0057798, filed May 14, 2020 and Korean Patent Application No. 10-2021-0048694, filed Apr. 14, 2021, the entire contents of all of which are hereby incorporated by reference.

TECHNICAL FIELD

This disclosure relates to a curable resin composition, a cured film prepared from the curable resin composition, and an electronic device including the cured film.

BACKGROUND ART

With development of a display field, various display devices using displays are being more diversified, and there is an increasing demand for a technology of applying a low refractive material to a device using light. Low refractive index properties of the low refractive material may be used to reduce a light loss inside the device where light moves and thus increase efficiency thereof. In addition, since the low refractive properties bring about a low reflectance effect, the low refractive material may be used for a low-refraction layer of lens outside a light sensor or an anti-reflection coating (AR) at the outmost of a display or a solar cell. Since the lower refractive index a low-refraction coating layer has, the smaller thickness the coating layer may have, the coating layer may have a wider margin, and efficiency thereof depending on a device purpose may be increased. When a low-refractive silicon material is used between layers of a panel, luminous efficiency may be increased by recycling a dose of light lost inside the device where the light moves. Particularly, since it is difficult to increase luminous efficiency of a green QD light emitting body among QD PR (quantum dot photoreflectance), the luminous efficiency of the green QD light emitting body may be increased by introducing the low-refractive coating film into under/lower portions of QD. On the other hand, when a lower substrate has a pattern, a high step difference between the patterns may occur, and when the lower refractive layer is coated on the lower substrate, the low refractive layer may be thicker, because a chemical liquid flows between the patterns. Accordingly, the low refractive layer should have crack resistance against cracks even despite a high thickness and simultaneously, maintain high transparency. Conventionally, in order to prevent the cracks during formation of the low refractive layer, a fluorine-based compound is included in the form of a polymer but increases a refractive index, failing in securing a satisfactory low refractive index.

DISCLOSURE

Technical Problem

An embodiment provides a curable resin composition having excellent crack resistance and transparency, and low refractive index and low reflectance.

Another embodiment provides a cured film prepared by using the curable resin composition.

Another embodiment provides an electronic device including the cured film.

Technical Solution

An embodiment provides a curable resin composition including (A) a silicone-based polymer, (B) hollow particles including a silane group-containing cyclodextrin-based compound including an unsaturated bond on the surface thereof, and (C) a solvent.

The silicone-based polymer may be a siloxane polymer formed by a hydrolytic condensation reaction of a compound represented by Chemical Formula 1 and/or a compound represented by Chemical Formula 2.

$$(R^1)_a(R^2)_b(R^3)_c\text{—Si—}(OR^4)_{4-a-b-c} \quad \text{[Chemical Formula 1]}$$

In Chemical Formula 1, $R^1$ to $R^3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C—O)—, wherein, R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a C1 to C30 alkyl group substituted with a (meth)acrylate group, a (meth)acryloyloxy group, or a combination thereof, $R^4$ is hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, and $$0 \le a+b+c < 4.$$

$$(R^7O)_{3-d-e}(R^5)_d(R^6)_e\text{—Si—}Y^1\text{—Si—}(R^8)_f(R^9)_g(OR^{10})_{3-f-g} \quad \text{[Chemical Formula 2]}$$

In Chemical Formula 2, $R^5$, $R^6$, $R^8$, and $R^9$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C═O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a C1 to C30 alkyl group substituted with a (meth)acrylate group, a (meth)acryloyloxy group, or a combination thereof, $R^7$ and $R^{10}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, $Y^1$ is hydrogen, a substituted or unsubstituted C1 to C30 alkylene group, a substituted or unsubstituted C3 to C30 cycloalkylene group, or a substituted or unsubstituted C6 to C30 arylene group, wherein the substituted or unsubstituted C6 to C30 arylene group consists of one aromatic ring, or includes two or more aromatic rings that are an aromatic ring group linked by a single bond, hydrogen, oxygen, a substituted or unsubstituted C1 to C30 alkylene group, or a substituted or unsubstituted C3 to C30 cycloalkylene group, or a combination thereof, $0 \le d+e < 3$, and $0 \le f+g < 3$.

The silicone-based polymer may be formed by a hydrolytic condensation reaction of 80 to 99 mol % of the compound represented by Chemical Formula 1 and 1 to 20 mol % of the compound represented by Chemical Formula 2.

The compound represented by Chemical Formula 1 may be a mixture of 5 to 90 mol % of the compound represented by Chemical Formula 1 with a+b+c=0, 10 to 95 mol % of the compound represented by Chemical Formula 1 with a+b+c=1, and 0 to 20 mol % of the compound represented by Chemical Formula 1 with a+b+c=2.

The silane group-containing cyclodextrin-based compound including the unsaturated bond may comprise a structural unit represented by Chemical Formula 3.

[Chemical Formula 3]

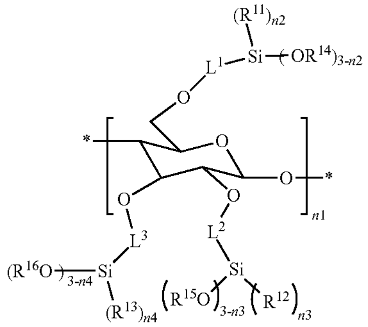

In Chemical Formula 3, $R^{11}$ to $R^{13}$ may each independently be hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C—O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a (meth)acryloyloxy group, or a combination thereof, $R^{14}$ to $R^{16}$ may each independently be a substituted or unsubstituted C1 to C10 alkenyl group, a (meth)acrylate group, a C1 to C30 alkyl group substituted with a (meth)acrylate group, or a combination thereof, $L^1$ to $L^3$ may each independently be a substituted or unsubstituted C1 to C10 alkylene group, n1 may be an integer of 5 to 32, and n2 to n4 may each independently be an integer of 0 to 2.

The $R^{14}$ to $R^{16}$ may each independently be a substituted or unsubstituted C1 to C5 alkenyl group, a (meth)acrylate group, a C1 to C15 alkyl group substituted with a (meth) acrylate group, or a combination thereof, $L^1$ to $L^3$ may each independently be a substituted or unsubstituted C1 to C5 alkylene group, n1 may be an integer of 5 to 8, and n2 to n4 may be 0.

A weight average molecular weight (Mw) in terms of polystyrene of the silicone-based polymer may be 5,000 to 5,000,000 g/mol.

The hollow particles may be fine particles of hollow metal oxides including titanium oxide, silicon oxide, barium oxide, zinc oxide, zirconium oxide, or a combination thereof.

An average diameter (D50) of the hollow particles may be 10 nm to 150 nm.

The silane group-containing cyclodextrin-based compound including the unsaturated bond may be included in an amount of 1 to 10 parts by weight per 100 parts by weight of the hollow particles.

The curable resin composition may include 10 to 200 parts by weight of (B) the hollow particles including the silane group-containing cyclodextrin-based compound including the unsaturated bond on the surface per 100 parts by weight of (A) the silicone-based polymer.

The curable resin composition may further include (D) an additive for surface modification.

Another embodiment provides a cured film obtained by curing the curable resin composition.

The cured film may have a refractive index of less than or equal to 1.25 at a wavelength of 500 nm to 550 nm.

The cured film may have a light transmittance of greater than or equal to 90% at a wavelength of 400 nm.

Another embodiment provides an electronic device including the cured film.

Advantageous Effects

The cured film prepared by using the curable resin composition according to an embodiment has excellent crack resistance, high transparency and low refractive properties, and thus may be advantageously used in applications such as an anti-reflection coating or low refractive layer.

BEST MODE

Hereinafter, embodiments of the present invention are described in detail. However, these embodiments are exemplary, the present invention is not limited thereto and the present invention is defined by the scope of claims.

In the present specification, when specific definition is not otherwise provided, "alkyl group" refers to a C1 to C30 alkyl group, "cycloalkyl group" refers to a C3 to C30 cycloalkyl group, "aryl group" refers to a C6 to C30 aryl group, "arylalkyl group" refers to a C7 to C30 arylalkyl group, "heteroalkyl group" refers to a C1 to C30 heteroalkyl group, "heterocycloalkyl group" refers to a C2 to C30 heterocycloalkyl group, "alkenyl group" refers to a C2 to C30 alkenyl group, "alkynyl group" refers to a C2 to C30 alkynyl group, "alkylene group" refers to a C1 to C30 alkylene group, "cycloalkylene group" refers to a C3 to C30 cycloalkylene group, and "arylene group" refers to a C6 to C30 arylene group.

In the present specification, when specific definition is not otherwise provided, "substituted" refers to replacement of at least one hydrogen by a substituent of a halogen atom (F, Cl, Br, or I), a hydroxy group, a C1 to C20 alkoxy group, a nitro group, a cyano group, an amine group, an amino group, an amino group substituted with an alkyl group, an amino group substituted with an aryl group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

In the present specification, when specific definition is not otherwise provided, "hetero" refers to one including at least one heteroatom selected from N, O, S, and P in chemical formulae.

In addition, unless otherwise specified in the specification, "(meth)acrylate" refers to both "acrylate" and "methacrylate," and "(meth)acryloyloxy group" refers to both "acryloyloxy group" and "methacryloyloxy group."

In the present specification, when specific definition is not otherwise provided, "combination" refers to mixing or copolymerization.

In the present specification, unless a specific definition is otherwise provided, a hydrogen atom is boned at the position when a chemical bond is not present where supposed to be given.

In the present specification, when specific definition is not otherwise provided, indicates a point where the same or different atom or chemical formula is linked.

Hereinafter, a curable resin composition according to an embodiment is described.

A curable resin composition according to an embodiment of the present invention includes (A) a silicone-based polymer, (B) hollow particles including a silane group-containing cyclodextrin-based compound including an unsaturated bond on the surface thereof, and (C) a solvent.

A color filter layer may exist under the low refractive layer inside the QD-OLED panel, and the color filter layer may have a step difference without a flat substrate due to the influence of the pattern. Accordingly, there is a problem that cracks occur when a composition having low refractive properties is coated and cured on the substrate due to the influence of the step generated under the low refractive layer.

In order to solve the above problem, there have been attempts to include an epoxy-based or fluorine-based compound in the curable resin composition forming a low refractive layer, but in this case, it is difficult to implement low refractive properties of less than or equal to 1.23, and even if low refractive properties of about 1.26 level are secured, there is still a problem in that cracks occur on the whole surface when the thickness of the cured film is greater than or equal to 2 μm.

In addition, even a conventional silicone-based material securing refractive index properties of less than or equal to 1.23 has a problem of lowering transparency of a cured film when a thickness of the cured film is increased to greater than or equal to 2 μm, and furthermore, when the cured film has a thickness of greater than or equal to 2.5 μm, there is problem of causing cracks in the whole surface.

The curable resin composition according to an embodiment includes hollow particles comprising a silane group-containing cyclodextrin-based compound including an unsaturated bond on a surface thereof and thereby may have low refractive properties and thus increase luminous efficiency of a light emitting body, and even when there is a step difference of greater than or equal to 5 μm, a cured film formed of the curable resin composition has crack resistance against cracks, and in addition, when the cured film has a thickness of greater than or equal to 2 μm, excellent transparency thereof may be realized.

For example, the cured film formed of the curable resin composition has the crack resistance of having no cracks, even though the thickness of the cured film is increased to 5 μm at a process temperature of 180° C. to 240° C.

In addition, the cured film may have a refractive index of less than or equal to 1.25, for example, less than or equal to 1.20, for example, less than or equal to 1.18, for example, less than or equal to 1.15, at a wavelength of 500 nm to 550 nm.

The silicone-based polymer may be a siloxane polymer formed by a hydrolytic condensation reaction of a compound represented by Chemical Formula 1 and/or compound represented by Chemical Formula 2.

$$(R^1)_a(R^2)_b(R^3)_c\text{—Si—}(OR^4)_{4-a-b-c} \qquad \text{[Chemical Formula 1]}$$

In Chemical Formula 1, $R^1$ to $R^3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C═O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a C1 to C30 alkyl group substituted with a (meth)acrylate group, a (meth)acryloyloxy group, or a combination thereof, $R^4$ is hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, and $$0 \le a+b+c < 4.$$

$$(R^7O)_{3-d-e}(R^5)_d(R^6)_e\text{—Si—}Y^1\text{—Si—}(R^8)_f(R^9)_g(OR^{10})_{3-f-g} \qquad \text{[Chemical Formula 2]}$$

In Chemical Formula 2, $R^5$, $R^6$, $R^8$, and $R^9$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C—O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a C1 to C30 alkyl group substituted with a (meth)acrylate group, a (meth)acryloyloxy group, or a combination thereof, $R^7$ and $R^{10}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, $Y^1$ is hydrogen, a substituted or unsubstituted C1 to C30 alkylene group, a substituted or unsubstituted C3 to C30 cycloalkylene group, or a substituted or unsubstituted C6 to C30 arylene group, wherein the substituted or unsubstituted C6 to C30 arylene group consists of one aromatic ring, or includes two or more aromatic rings that are an aromatic ring group linked by a single bond, hydrogen, oxygen, a substituted or unsubstituted C1 to C30 alkylene group, or a substituted or unsubstituted C3 to C30 cycloalkylene group, or a combination thereof, $$0 \leq d+e < 3, \text{ and}$$

$$0 \leq f+g < 3.$$

The silicone-based polymer may be formed by a hydrolytic condensation reaction of 80 to 99 mol % of the compound represented by Chemical Formula 1 and 1 to 20 mol % of the compound represented by Chemical Formula 2, for example, 80 to 95 mol % of the compound represented by Chemical Formula 1 and 5 to 20 mol % of the compound represented by Chemical Formula 2, for example, 80 to 90 mol % of the compound represented by Chemical Formula 1 and 10 to 20 mol % of the compound represented by Chemical Formula 2, for example, 80 to 85 mol % of the compound represented by Chemical Formula 1 and 15 to 20 mol % of the compound represented by Chemical Formula 2, for example, 85 to 99 mol % of the compound represented by Chemical Formula 1 and 1 to 15 mol % of the compound represented by Chemical Formula 2, for example, 90 to 99 mol % of the compound represented by Chemical Formula 1 and 1 to 10 mol % of the compound represented by Chemical Formula 2, for example, 95 to 99 mol % of the compound represented by Chemical Formula 1 and 1 to 5 mol % of the compound represented by Chemical Formula 2. When the compound represented by Chemical Formula 1 and the compound represented by Chemical Formula 2 are included within the ranges and a hydrolytic condensation reaction is performed, crack resistance properties and low refractive properties of the curable resin composition including the silicone-based polymer may be improved.

The compound represented by Chemical Formula 1 may be a mixture of 5 to 90 mol % of the compound represented by Chemical Formula 1 with a+b+c=0, 10 to 95 mol % of the compound represented by Chemical Formula 1 with a+b+c=1, and 0 to 20 mol % of the compound represented by Chemical Formula 1 with a+b+c=2. When the compound represented by Chemical Formula 1 with a+b+c=0, the compound represented by Chemical Formula 1 with a+b+c=1, and the compound represented by Chemical Formula 1 with a+b+c=2 are included in the above ranges, a curable resin composition including the silicone-based polymer may have improved crack resistance properties and low refractive properties.

The silane group-containing cyclodextrin-based compound including the unsaturated bond may include a structural unit represented by Chemical Formula 3.

[Chemical Formula 3]

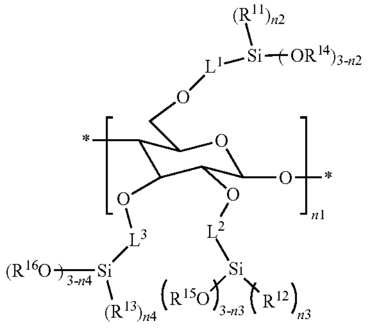

In Chemical Formula 3, $R^{11}$ to $R^{13}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C=O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a (meth)acryloyloxy group, or a combination thereof, $R^{14}$ to $R^{16}$ are each independently a substituted or unsubstituted C1 to C10 alkenyl group, a (meth)acrylate group, a C1 to C30 alkyl group substituted with a (meth)acrylate group, or a combination thereof, $L^1$ to $L^3$ are each independently a substituted or unsubstituted C1 to C10 alkylene group, n1 is an integer of 5 to 32, n2 to n4 are each independently an integer of 0 to 2.

In Chemical Formula 3, "*" indicated at both ends of the structural unit means a linked portion.

Specifically, the n1 silane group-containing dextrin-based structural units in Chemical Formula 3 may form a ring structure through "*" and thus may provide the silane group-containing cyclodextrin-based compound.

For example, the silane group-containing cyclodextrin-based compound formed from the structural unit represented by Chemical Formula 3 is schematically represented as shown in Chemical Formula 4.

[Chemical Formula 4]

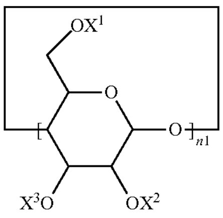

In Chemical Formula 4, $X^1$ is the same as $*-L^1-Si\ R^{11}{}_{n2}\ OR^{14}{}_{3-n2}$ described above, $X^2$ is the same as $*-L^2-Si(R^{12})_{n3}(OR^{15})_{3-n3}$ described above, $X^3$ is the same as $*-L^3-Si(R^{13})_{n4}(OR^{16})_{3-n4}$ described above, and the definitions of $L^1$ to $L^3$, $R^{11}$ to $R^{16}$, and n1 to n4 are the same as described above.

A more specific example of Chemical Formula 4 may be a structure in which n1=7, and may be, for example, represented by Chemical Formula 4-1.

[Chemical Formula 4-1]

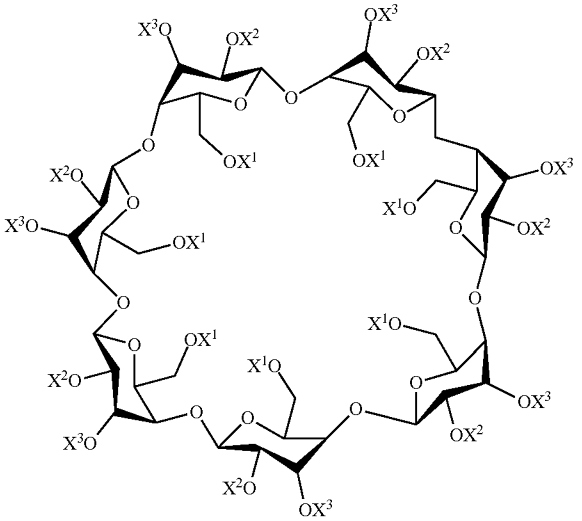

In Chemical Formula 4-1, $X^1$ to $X^3$ are the same as described above.

The hollow particles include the silane group-containing cyclodextrin-based compound including the unsaturated bond on the surface thereof, and thus the low refractive properties of the curable resin composition including the hollow particles may be improved.

For example, in the case of a general silicone-based resin that does not include the surface-treated hollow particles, the refractive index at a wavelength of 500 nm to 550 nm is greater than or equal to about 1.35. However, in the case of the curable resin composition according to the present invention, the refractive index measured at a wavelength of 500 nm to 550 nm decreases to 1.25 or less by including the hollow particles including the silane group-containing cyclodextrin-based compound including the unsaturated bond on the surface thereof. When the light emitting body includes a cured film prepared from a curable resin composition having a low refractive index, the luminous efficiency of the light emitting body may be increased.

In addition, the curable resin composition may improve crack resistance properties by including the hollow particles including the silane group-containing cyclodextrin-based compound including the unsaturated bond on a surface thereof. This is expected as a result of the increased flexibility of the curable resin composition as the hollow particles include the silane group-containing cyclodextrin-based compound including the unsaturated bond on the surface thereof.

In addition, as the hollow particles include the silane group-containing cyclodextrin-based compound including the unsaturated bond on the surface thereof, compatibility with the silicone-based polymer contained in the curable resin composition may be increased and thus, a cured film prepared using the curable resin composition may have improved transparency.

$R^{14}$ to $R^{16}$ of Chemical Formula 3 may each independently be a substituted or unsubstituted C1 to C5 alkenyl group, a (meth)acrylate group, a C1 to C15 alkyl group substituted with a (meth)acrylate group, or a combination thereof, $L^1$ to $L^3$ are each independently a substituted or unsubstituted C1 to C5 alkylene group, n1 may be an integer of 5 to 8, and n2 to n4 may be 0.

Meanwhile, the weight average molecular weight (Mw) in terms of polystyrene of the silicone-based polymer may be 5,000 to 5,000,000 g/mol, for example, 50,000 g/mol to 5,000,000 g/mol, for example, 500,000 g/mol to 5,000,000 g/mol, but is not limited thereto.

The hollow particles may be fine particles of hollow metal oxides including titanium oxide ($TiO_2$), silicon oxide ($SiO_2$), barium oxide (BaO), zinc oxide (ZnO), zirconium oxide ($ZrO_2$), or a combination thereof, but is not limited thereto.

The titanium oxide, silicon oxide, barium oxide, zinc oxide, and zirconium oxide may further include other metal elements in the compound.

In an embodiment, the hollow metal oxide fine particles may be hollow silica ($SiO_2$), but are not limited thereto.

The hollow particles may have an average diameter (D50) of greater than or equal to 10 nm, greater than or equal to 20 nm, greater than or equal to 30 nm, greater than or equal to 40 nm, greater than or equal to 50 nm, greater than or equal to 60 nm, or greater than or equal to 70 nm, and less than or equal to 150 nm, and less than or equal to 140 nm, less than or equal to 130 nm, less than or equal to 120 nm, less than or equal to 110 nm, less than or equal to 100 nm, less than or equal to 90 nm, or less than or equal to 80 nm, but are not limited thereto. When the average diameter size of the hollow particles satisfies the above ranges, the hollow particles may be well dispersed in the siloxane polymer, and low refractive properties of the curable resin composition may be improved.

The hollow particles may have a porosity of greater than or equal to 40%, greater than or equal to 50%, or greater than or equal to 60%, and less than or equal to 90%, less than or equal to 80%, or less than or equal to 70%, but are not limited thereto. When the porosity of the hollow particles exceeds the above range, the size of the inner space of the hollow particles increases and the thickness of the outer surface decreases, so that the durability of the hollow particles may be weakened, while when the porosity of the hollow particles is less than the above range, the effect of reducing the refractive index of the low refractive layer may be insignificant.

The silane group-containing cyclodextrin-based compound including the unsaturated bond may be included in an amount of 1 to 10 parts by weight, for example, 1 to 9.5 parts by weight, for example, 1 to 8 parts by weight, for example, 1 to 8.5 parts by weight, for example, 1 to 8 parts by weight, for example, 1 to 7.5 parts by weight, for example, 1 to 7 parts by weight, for example, 1 to 6.5 parts by weight, for example, 1 to 6 parts by weight, for example, 1 to 5.5 parts by weight, for example, 1 to 5 parts by weight, for example, 1.5 to 5 parts by weight, for example, 2 to 5 parts by weight, and for example, 2.5 to 5 parts by weight per 100 parts by weight of the hollow particles, but are not limited thereto. When the silane group-containing cyclodextrin-based compound including the unsaturated bond is included in the above range, crack resistance and transparency characteristics of the curable resin composition may be further improved.

(B) The hollow particles including the silane group-containing cyclodextrin-based compound including the unsaturated bond on the surface thereof may be included in an amount of 10 to 200 parts by weight, for example, 10 to 190 parts by weight, for example, 10 to 180 parts by weight, for example, 10 to 170 parts by weight, for example, 10 to 160 parts by weight, for example, 10 to 150 parts by weight, for example, 10 to 140 parts by weight, for example, 10 to 130 parts by weight, for example, 10 to 120 parts by weight, for example, 10 to 110 parts by weight, for example, 10 to 100 parts by weight, for example, 10 to 90 parts by weight, for example, 10 to 80 parts by weight, for example, 10 to 70 parts by weight, for example, 10 to 60 parts by weight, for example, 10 to 50 parts by weight, for example, 10 to 40 parts by weight, for example, 10 to 30 parts by weight, for example, 10 to 20 parts by weight, for example, 20 to 200 parts by weight, for example, 30 to 200 parts by weight, for example, 40 to 200 parts by weight, for example, 50 to 200 parts by weight, for example, 60 to 200 parts by weight, for example, 70 to 200 parts by weight, for example, 80 to 200 parts by weight, for example, 90 to 200 parts by weight, for example, 100 to 200 parts by weight, for example, 110 to 200 parts by weight, for example, 120 to 200 parts by weight, for example, 130 to 200 parts by weight, for example, 140 to 200 parts by weight, for example, 150 to 200 parts by weight, for example, 160 to 200 parts by weight, for example, 170 to 200 parts by weight, for example, 180 to 200 parts by weight, for example, 190 to 200 parts by weight per 100 parts by weight of the silicone-based polymer. When the amount of (B) the hollow particles including the silane group-containing cyclodextrin-based compound including the unsaturated bond on the surface thereof satisfies the above ranges, compatibility between the hollow particles and the silicone-based polymer may be increased, and the curable resin composition may have further improved crack resistance and transparency.

(C) The solvent may be any solvent that may be used at a process temperature of 200° C. or higher. For example, the solvent may be an alcohol type solvent such as butanol, isopropanol, etc., and a ketone type solvent such as diisobutyl ketone (DIBK), and other solvents known in the art and as an arbitrary solvent that can be used above the above process temperature, one type or two or more types of solvents may be used in combination in addition to the solvent.

When two or more solvents are mixed and used, propylene glycol methyl ether acetate (PGMEA), gamma butyrolactone (GBL), and other types of solvents that can be used at a process temperature of 100° C. to 230° C. may be mixed.

The solvent may be, for example, as an aprotic solvent, an ether-based solvent such as diethyl ether, methylethylether, methyl-n-di-n-propyl ether, di-iso-propyl ether, tetrahydrofuran, methyl tetrahydrofuran, dioxane, dimethyldioxane, ethylene glycol dimethylether, ethylene glycol diethylether, ethylene glycol di-n-propyl ether, ethylene glycol dibutyl ether, diethylene glycoldimethylether, diethylene glycoldiethylether, diethylene glycol methylethylether, diethylene glycol methyl mono-n-propyl ether, diethylene glycol methyl mono-n-butyl ether, diethylene glycoldi-n-propyl ether, diethylene glycoldi-n-butylether, diethylene glycol methyl mono-n-hexylether, triethylene glycol dimethylether, triethylene glycol diethyl ether, triethylene glycol methylethylether, triethylene glycol methyl mono-n-butyl ether, triethylene glycol di-n butyl ether, triethylene glycol methyl mono-n-hexylether, tetraethylene glycoldimethylether, tetraethylene glycol diethylether, tetradiethylene glycol methylethylether, tetraethylene glycol methyl mono-n-butyl ether, tetraethylene glycol methyl mono-n-hexylether, tetraethylene glycoldi-n-butyl ether, propylene glycol dimethylether, propylene glycol diethyl ether, propylene glycol di-n-propyl ether, propylene glycol dibutylether, dipropylene glycol dimethylether, dipropylene glycol diethylether, dipropylene glycol methylethylether, dipropylene glycol methyl mono-n-butyl ether, dipropylene glycol di-n-propyl ether, dipropylene glycol di-n-butyl ether, dipropylene glycol methyl mono-n-hexylether, tripropylene glycoldi methylether, tripropylene glycol diethylether, tripropylene glycol methylethylether, tripropylene glycol methyl mono-n-butyl ether, tripropylene glycoldi-n-butyl ether, tripropylene glycol methyl mono-n-hexylether, tetrapropylene glycol dimethylether, tetrapropylene glycol diethyl ether, tetradipropylene glycol methylethylether, tetrapropylene glycol methyl mono-n-butyl ether, tetrapropylene glycol methyl mono-n-hexylether, tetrapropylene glycol di-n-butylether, and the like; an ester-based solvent such as methyl acetate, ethyl acetate, n-propyl acetate, i-propyl acetate, n-butyl acetate, i-butyl acetate, sec-butyl acetate, n-pentyl acetate, sec-pentyl acetate, 3-methoxybutyl acetate, methyl pentyl acetate, 2-ethyl butyl acetate, 2-ethylhexyl acetate, benzyl acetate, cyclohexyl acetate, methyl cyclohexyl acetate, nonyl acetate, acetomethyl acetate, acetoethyl acetate, diethylene glycol mono methylether acetate, diethylene glycol monoethylether acetate, diethylene glycol mono-n-butyl ether acetate, dipropylene glycol mono methylether acetate, dipropylene glycol mono ethylether acetate, glycol diacetate, methoxy triglycol diacetate, ethyl propionate, n-butyl propionate, i-amyl propionate, diethyl oxalate, di-n-butyl oxalate, and the like; an ether acetate-based solvent such as ethylene glycol methylether propionate, ethylene glycol ethylether propionate, ethylene glycol methylether acetate, ethylene glycol ethylether acetate, diethylene glycol methylether acetate, diethylene glycol ethylether acetate, diethylene glycol-n-butyletheracetate, propylene glycol methylether acetate, propylene glycol ethylether acetate, propylene glycol propyl ether acetate, dipropylene glycol methylether acetate, dipropylene glycol ethylether acetate, and the like.

The solvent may be, for example, as a protic solvent, an alcohol based solvent such as methanol, ethanol, n-propanol, i-propanol, n-butanol, i-butanol, sec-butanol, t-butanol, n-pentenol, i-pentenol, 2-methylbutanol, sec-pentenol, t-pentenol, 3-methoxy butanol, n-hexanol, 2-methylpentanol, sec-hexanol, 2-ethyl butanol, sec-heptanol, n-octanol, 2-ethyl hexanol, sec-octanol, n-nonyl alcohol, n-decanol, sec-undecyl alcohol, trimethyl nonyl alcohol, sec-tetradecylalcohol, sec-heptadecyl alcohol, phenol, cyclohexanol, methylcyclohexanol, benzyl alcohol, ethylene glycol, 1,2-propylene glycol, 1,3-butylene glycol, diethylene glycol, dipropylene glycol, triethylene glycol, tripropylene glycol, and the like; an ether-based solvent such as ethylene glycol methylether, ethylene glycol ethylether, ethylene glycolmono phenyl ether, diethylene glycolmono methylether, diethylene glycolmono ethylether, diethylene glycolmono-n-butyl ether, diethylene glycolmono-n-hexylether, ethoxytriglycol, tetraethylene glycolmono-n-butyl ether, propylene glycol mono methylether, propylene glycol propyl ether, dipropylene glycol mono methylether, dipropylene glycol mono ethylether, tripropylene glycol mono methylether, and the like; an ester-based solvent such as methyl lactate, ethyl lactate, n-butyl lactate, n-amyl lactate, and the like. Among these, the alcohol-based solvent is desirable from the viewpoint of storage stability.

In an embodiment, the solvent may be included in an amount of 300 to 2,000 parts by weight, for example, 500 to 2,000 parts by weight, for example, 800 to 2,000 parts by weight, for example, 1,000 to 2,000 parts by weight, for example, 1,300 to 2,000 parts by weight, for example, 1,500 to 2,000 parts by weight based on a sum amount, 100 parts by weight of the silicone-based polymer, for example, the siloxane polymer and the hollow particles including the silane group-containing cyclodextrin-based compound including the unsaturated bond on the surface thereof, but is not limited thereto.

The curable resin composition may further include a curing catalyst for accelerating curing of a silicone-based polymer, for example, an unreacted silanol group or an epoxy group at the terminal end of the siloxane resin of the siloxane polymer. Such a curing catalyst may be a thermosetting catalyst or a photocuring catalyst. In addition, depending on the used polymer, such a curing catalyst may not be included. In an embodiment, examples of the curable catalyst for curing the silicone-based polymer may include those having an ammonium salt form such as tetrabutylammonium acetate (TBAA).

When using the curing catalyst, this catalyst may be included in an amount of 0.1 to 1 part by weight, for example, 0.3 to 1 part by weight, for example, 0.5 to 1 part by weight, for example, 0.7 to 1 part by weight, for example, 0.8 to 1 part by weight based on 100 parts by weight of the silicone-based polymer, but is not limited thereto.

The curable resin composition may further include (D) an additive for surface modification.

As the additive for surface modification, a surfactant, for example, a fluorine-based surfactant may be further included, but is not limited thereto.

When the composition includes the surfactant and the composition is used as a composition for forming a low refractive layer, coating properties may be improved and defects may be prevented from being generated when coated on a substrate.

The additive for surface modification may be included in an amount of less than or equal to 5 parts by weight, for example, 1 to 5 parts by weight, for example, 2 to 5 parts by weight, for example, 3 to 5 parts by weight, based on 100 parts by weight of the silicone-based polymer, but is not limited thereto.

Another embodiment may provide a cured film obtained by curing the curable resin composition.

The cured film may have a thickness of 2.5 to 5.0 μm, for example, 3.0 to 5.0 μm, for example, 3.5 to 5.0 μm, for example, 4.0 to 5.0 μm, for example 4.5 to 5.0 μm at a curing process temperature of 180° C. to 240° C.

The cured film may have a refractive index of less than or equal to 1.25 for example, less than or equal to 1.24, for example, less than or equal to 1.23, for example, less than or equal to 1.22, for example, less than or equal to 1.21, for example, less than or equal to 1.20, for example, less than or equal to 1.19, for example, less than or equal to 1.18, for example, less than or equal to 1.17, for example, less than or equal to 1.16, for example, less than or equal to 1.15 at a wavelength of 500 nm to 550 nm.

The cured film may have a light transmittance of greater than or equal to 90% at a wavelength of 400 nm.

Another embodiment may provide an electronic device including the cured film.

MODE FOR INVENTION

Hereinafter, preferred examples of the present invention will be described. However, the following examples are only preferred examples of the present invention, and the present invention is not limited by the following examples.

EXAMPLES

Synthesis Example 1: Preparation of Siloxane Polymer (A-1)

1 kg of a mixed solvent prepared by mixing water and propylene glycol monomethyl ether acetate in a weight ratio of 1:80 was put in a 3-neck flask, and while maintained at 25° C., 1 g of a 60% $HNO_3$ aqueous solution was added thereto. Subsequently, as monomers, a mixture of methyltrimethoxy silane and tetraethylorthosilicate mixed in a mole ratio of 0.75:0.25 was added thereto. After putting all the solvent, the monomers, and a catalyst, the temperature was increased up to 60° C., and the obtained mixture was heated and refluxed for 72 hours to perform a condensation polymerization reaction and thus obtain a siloxane polymer solution (A-1). The obtained siloxane polymer solution (A-1) had a solid content of 20 wt %, and when a molecular weight (polystyrene conversion) of the obtained siloxane copolymer was measured with GPC, the weight average molecular weight was 3,500 g/mol.

Synthesis Example 2: Preparation of Siloxane Polymer (A-2)

1 kg of a mixed solvent prepared by mixing water and propylene glycolmonomethyl ether acetate in a weight ratio of 1:80 was put in a 3-neck flask, and while maintained at 25° C., 1 g of a 60% $HNO_3$ aqueous solution was added thereto. Subsequently, as a monomer, a mixture of methyltrimethoxysilane and tetraethylorthosilicate in a mole ratio of 0.60:0.40 was added thereto. After putting all the solvent, the monomers, and a catalyst, the temperature was increased up to 60° C., and the obtained mixture was heated and refluxed for 72 hours to perform a condensation polymerization reaction and thus obtain a siloxane polymer solution (A-1). The obtained siloxane polymer solution (A-1) had a solid content of 20 wt %, and when a molecular weight (polystyrene conversion) of the obtained siloxane copolymer was measured with GPC, the weight average molecular weight was 3,700 g/mol.

Synthesis Example 3: Preparation of Siloxane Polymer (A-3)

1 kg of a mixed solvent prepared by mixing water and propylene glycolmonomethyl ether acetate in a weight ratio of 1:80 was put in a 3-neck flask, and while maintained at 25° C., 1 g of a 60% $HNO_3$ aqueous solution was added thereto. Subsequently, as a monomer, a mixture of methyltrimethoxysilane and tetraethylorthosilicate in a mole ratio of 0.40:0.60 was added thereto. After putting all the solvent, the monomers, and a catalyst, the temperature was increased up to 60° C., the obtained mixture was heated and refluxed for 72 hours to perform a condensation polymerization reaction and thus obtain a siloxane polymer solution (A-1). The obtained siloxane polymer solution (A-1) had a solid content of 20 wt %, and when a molecular weight (polystyrene conversion) of the obtained siloxane copolymer was measured with GPC, the weight average molecular weight was 4,200 g/mol.

Synthesis Example 4: Preparation of Surface-Treated Hollow Particles (B-1)

5.24 g of cyclodextrin was dissolved in 20 mL of dimethylformamide (DMF) and then, slowly injected into a DMF solution in which NaH was dissolved to induce a dehydrogenation reaction, and 21 mL of allylbromide was added thereto in a dropwise fashion to proceed the reaction. Subsequently, cyclodextrin containing an allyl group was prepared by removing the solvent and excessive allylbromide. The cyclodextrin was dissolved again in 1.8 g of vinyltrimethoxysilane, an appropriate amount of a platinum oxide catalyst was added thereto to proceed a reaction, and the solvent and the catalyst were removed to obtain a cyclodextrin compound represented by Chemical Formula A (Yield: about 80%).

Subsequently, the cyclodextrin compound represented by Chemical Formula A was coated on the surfaces of hollow-type aluminosilicate ($Al_2SiO_5$) particles to obtain surface-treated hollow particles (B-1).

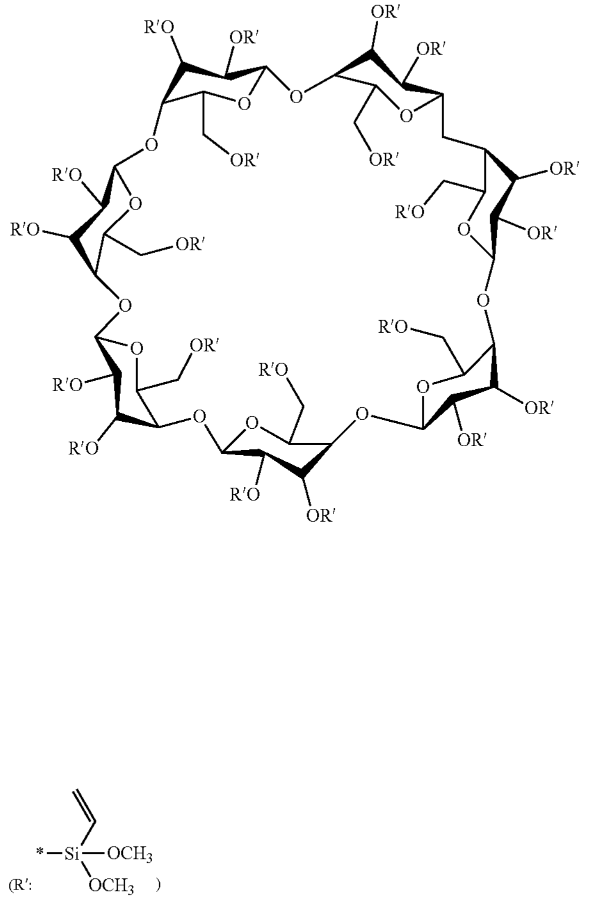

Synthesis Example 5: Preparation of Surface-Treated Hollow Particles (B-2)

A cyclodextrin compound represented by Chemical Formula B (Yield: about 80%) was prepared according to the same method as Synthesis Example 4 except that vinyltriethoxysilane was used instead of the vinyltrimethoxysilane.

Subsequently, the cyclodextrin compound represented by Chemical Formula B was coated on the surfaces of hollow-type aluminosilicate ($Al_2SiO_5$) particles to obtain surface-treated hollow particles (B-2).

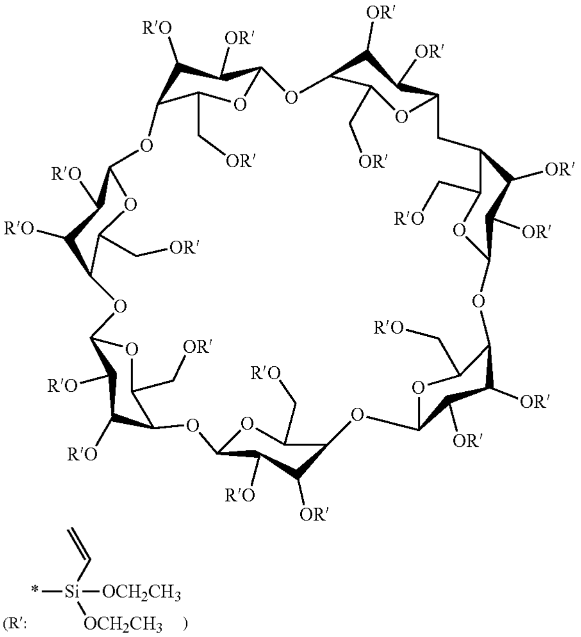

Preparation of Curable Resin Composition

Specifications of the components used to prepare the curable resin composition are as follows.

(A) Polymer (A-1) Siloxane polymer according to Synthesis Example 1

(A-2) Siloxane polymer according to Synthesis Example 2

(A-3) Siloxane polymer according to Synthesis Example 3

(A-4) Acrylic copolymer (benzyl methacrylate/methacrylic acid/methyl benzyl acrylate terpolymer (RY-35-1, SHOWA DENCO, weight average molecular weight (Mw): 15,800 g/mol, acid value: 77 KOHmg/g)

(B) Hollow Particles (B-1) Surface-treated hollow particles according to Synthesis Example 4

(B-2) Surface-treated hollow particles according to Synthesis Example 5

(B-3) Dispersion of hollow particles surface-treated with methacryloxypropyltrimethoxysilane (solid content: 20%, average diameter of hollow particle: 85 nm; L0516, Nano Advanced Materials)

(C) Solvent

Propylene glycolmonomethyl ether acetate (PGMEA)

(D) Other Additives

Surfactant (F-552, DIC Co., Ltd.)

Examples 1 to 9 and Comparative Examples 1 and 2: Preparation of Curable Resin Compositions 8 wt % of the siloxane polymer (A-1) according to Synthesis Example 1, 4 wt % of the surface-treated hollow particle dispersion (B-1) according to Synthesis Example 4, 87 wt % of a solvent, and 1 wt % of a surfactant were each mixed and then, stirred for about 30 minutes to prepare a curable resin composition according to Example 1.

In addition, each component was mixed in the compositions shown in Table 1 to prepare curable resin compositions according to Examples 2 to 9 and Comparative Examples 1 and 2 in the same method as Example 1.

TABLE 1

(unit: wt %)

| | | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|---|
| Polymer | A-1 | 8 | | | 8 | | | 4 | 4 | | 8 | |
| | A-2 | | 8 | | | 8 | | | | | | |
| | A-3 | | | 8 | | | 8 | 4 | 4 | 8 | | |
| | A-4 | | | | | | | | | | | 8 |
| Hollow particles | B-1 | 4 | 4 | 4 | | | | 4 | | 2 | | |
| | B-2 | | | | 4 | 4 | 4 | | 4 | 2 | | |
| | B-3 | | | | | | | | | | 4 | 4 |
| Solvent | | 87 | 87 | 87 | 87 | 87 | 87 | 87 | 87 | 87 | 87 | 87 |
| Additive | | 1 | 1 | 1 | 1 | 1 | 1 | 1 | 1 | 1 | 1 | 1 |

Preparation and Evaluation of Cured Films (1) Evaluation of Refractive Index

The curable resin compositions according to Examples 1 to 9 and Comparative Examples 1 and 2 were respectively spin-coated on a silicon wafer with a spin coater (MS-A100, Mikasa Co., Ltd.) at 200 rpm for 20 seconds and then, baked on a hot-plate at 230° C. for 20 minutes to form 2.5 μm-thick coating cured films.

The cured films were measured with respect to a refractive index at a wavelength of 370 nm to 1,000 nm by using Ellipsometer Base-160 (J.A. Woollam Co.), and the results at 550 nm are shown in Table 2.

(2) Evaluation of Crack Resistance

The curable resin compositions according to Examples 1 to 9 and Comparative Examples 1 and 2 were respectively spin-coated on a glass substrate with a spin coater MS-A100 (Mikasa Co., Ltd.) at 100 to 150 rpm for 5 seconds and then, baked on a hot-plate at 100° C. for 2 minutes and at 230° C. for 20 minutes to form 4.0 μm-thick coating cured films.

The cured films were measured with respect to a step thickness by using Tencor (KLA P-6), but when there were no cracks, the cured films were partially peeled off with a razor and the measured with respect to the step thickness by using Tencor, and the results are shown in Table 2.

(3) Evaluation of Haze/Transmittance

The curable resin compositions according to Examples 1 to 9 and Comparative Examples 1 and 2 were respectively spin-coated on a glass substrate at 200 rpm for 10 seconds with a spin coater (MS-A100, Mikasa Co., Ltd.) and then, baked on a hot-plate at 100° C. for 2 minutes and at 230° C. for 20 minutes to obtain 4.0 μm-thick coating cured films.

The cured films were measured with respect to a degree of turbidity as a haze value with a haze meter at a wavelength of 650 nm, and simultaneously transmittance at the wavelength of 650 nm was obtained, and the results are shown in Table 2.

TABLE 2

| | Refractive index | Crack margin (μm) | Haze at a thickness of 4.0 μm (%) | Transmittance at a thickness of 4.0 μm (%) |
|---|---|---|---|---|
| Example 1 | 1.212 | 4.64 | 0.42 | 94.09 |
| Example 2 | 1.197 | 4.35 | 0.38 | 94.21 |
| Example 3 | 1.181 | 4.19 | 0.30 | 94.43 |
| Example 4 | 1.234 | 4.87 | 0.44 | 94.02 |

TABLE 2-continued

| | Refractive index | Crack margin (μm) | Haze at a thickness of 4.0 μm (%) | Transmittance at a thickness of 4.0 μm (%) |
|---|---|---|---|---|
| Example 5 | 1.216 | 4.46 | 0.35 | 94.38 |
| Example 6 | 1.195 | 4.22 | 0.27 | 94.45 |
| Example 7 | 1.189 | 4.55 | 0.36 | 94.30 |
| Example 8 | 1.200 | 4.68 | 0.31 | 94.39 |
| Example 9 | 1.184 | 4.20 | 0.28 | 94.43 |
| Comparative Example 1 | 1.313 | 2.08 | 2.69 | 91.98 |
| Comparative Example 2 | 1.406 | 3.29 | 0.42 | 92.86 |

Referring to Table 2, the cured films including hollow particles surface-treated with the silane group-containing cyclodextrin-based compound including the unsaturated bond according to Examples 1 to 9 maintained low refractive properties and exhibited excellent crack resistance and transparency, compared with the cured films according to Comparative Examples 1 and 2.

The present invention is not limited by the example embodiments and may be performed in various forms, and those skilled in the art will be able to understand that the present invention can be implemented in other detailed forms without changing the technical spirit or an essential characteristic. Therefore, the aforementioned embodiments should be understood to be exemplary but not limiting the present invention in any way.

The invention claimed is:

1. A curable resin composition, comprising:

(A) a silicone-based polymer;

(B) hollow particles including a silane group-containing cyclodextrin-based compound including an unsaturated bond on the surface thereof; and (C) a solvent, wherein the silane group-containing cyclodextrin-based compound including an unsaturated bond comprises a structural unit represented by Chemical Formula 3:

[Chemical Formula 3]

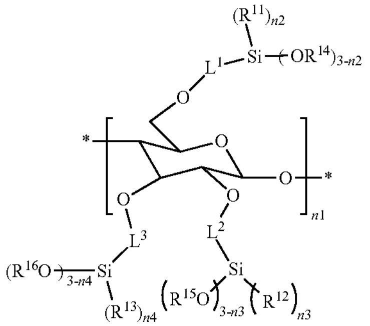

wherein, in Chemical Formula 3, $R^{11}$ to $R^{13}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C═O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a (meth)acryloyloxy group, or a combination thereof, $R^{14}$ to $R^{16}$ are each independently a substituted or unsubstituted C1 to C10 alkenyl group, a (meth)acrylate group, a C1 to C30 alkyl group substituted with a (meth)acrylate group, or a combination thereof, $L^1$ to $L^3$ are each independently a substituted or unsubstituted C1 to C10 alkylene group, n1 is an integer of 5 to 32, and n2 to n4 are each independently an integer of 0 to 2.

2. The curable resin composition of claim 1, wherein the silicone-based polymer is a siloxane polymer formed by a hydrolytic condensation reaction of a compound represented by Chemical Formula 1 and/or a compound represented by Chemical Formula 2:

$$(R^1)_a(R^2)_b(R^3)_c\text{—Si—}(OR^4)_{4-a-b-c} \quad \text{[Chemical Formula 1]}$$

wherein, in Chemical Formula 1, $R^1$ to $R^3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C—O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a C1 to C30 alkyl group substituted with a (meth)acrylate group, a (meth)acryloyloxy group, or a combination thereof, $R^4$ is hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, and $$0 \le a+b+c < 4;$$

$$(R^{70})_{3-d-e}(R^5)_a(R^6)_e\text{—Si—}Y^1\text{—Si—}(R^8)_f(R^9)_g(OR^{10})_{3-f-g} \quad \text{[Chemical Formula 2]}$$

wherein, in Chemical Formula 2, $R^5$, $R^6$, $R^8$, and $R^9$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C2 to C30 alkynyl group, R(C═O)—, wherein R is a substituted or unsubstituted C1 to C30 alkyl group, a substituted or unsubstituted C3 to C30 cycloalkyl group, or a substituted or unsubstituted C6 to C30 aryl group, an epoxy group, a (meth)acrylate group, a C1 to C30 alkyl group substituted with a (meth)acrylate group, a (meth)acryloyloxy group, or a combination thereof, $R^7$ and $R^{10}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, $Y^1$ is hydrogen, a substituted or unsubstituted C1 to C30 alkylene group, a substituted or unsubstituted C3 to C30 cycloalkylene group, or a substituted or unsubstituted C6 to C30 arylene group, wherein the substituted or unsubstituted C6 to C30 arylene group consists of one aromatic ring, or includes two or more aromatic rings that are an aromatic ring group linked by a single bond, hydrogen, oxygen, a substituted or unsubstituted C1 to C30 alkylene group, or a substituted or unsubstituted C3 to C30 cycloalkylene group, or a combination thereof, $$0 \le d+e < 3, \text{ and}$$

$$0 \le f+g < 3.$$

3. The curable resin composition of claim 2, wherein the silicone-based polymer is formed by a hydrolytic condensation reaction of 80 to 99 mol % of the compound represented by Chemical Formula 1 and 1 to 20 mol % of the compound represented by Chemical Formula 2.

4. The curable resin composition of claim 2, wherein the compound represented by Chemical Formula 1 is a mixture of 5 to 90 mol % of the compound represented by Chemical Formula 1 with a+b+c=0, 10 to 95 mol % of the compound represented by Chemical Formula 1 with a+b+c=1, and 0 to 20 mol % of the compound represented by Chemical Formula 1 with a+b+c=2.

5. The curable resin composition of claim 1, wherein $R^{14}$ to $R^{16}$ are each independently a substituted or unsubstituted C1 to C5 alkenyl group, a (meth)acrylate group, a C1 to C15 alkyl group substituted with a (meth)acrylate group, or a combination thereof, $L^1$ to $L^3$ are each independently a substituted or unsubstituted C1 to C5 alkylene group, n1 is an integer of 5 to 8, and n2 to n4 are 0.

6. The curable resin composition of claim 1, wherein a weight average molecular weight (Mw) in terms of polystyrene of the silicone-based polymer is 5,000 to 5,000,000 g/mol.

7. The curable resin composition of claim 1, wherein the hollow particles are fine particles of hollow metal oxides including titanium oxide, silicon oxide, barium oxide, zinc oxide, zirconium oxide, or a combination thereof.

8. The curable resin composition of claim 1, wherein an average diameter (D50) of the hollow particles is 10 nm to 150 nm.

9. The curable resin composition of claim 1, wherein the silane group-containing cyclodextrin-based compound including the unsaturated bond is included in an amount of 1 to 10 parts by weight per 100 parts by weight of the hollow particles.

10. The curable resin composition of claim 1, wherein the curable resin composition comprises 10 to 200 parts by weight of the hollow particles including (B) the silane group-containing cyclodextrin-based compound including an unsaturated bond on the surface per 100 parts by weight of (A) the silicone-based polymer.

11. The curable resin composition of claim 1, which further comprises (D) an additive for surface modification.

12. A cured film obtained by curing the curable resin composition of claim 1.

13. The cured film of claim 12, wherein the cured film has a refractive index of less than or equal to 1.25 at a wavelength of 500 nm to 550 nm.

14. The cured film of claim 12, wherein the cured film has a light transmittance of greater than or equal to 90% at a wavelength of 400 nm.

15. An electronic device comprising the cured film of claim 12.

* * * * *